Aug. 4, 1970   E. O. HENRIQUES   3,522,928
FIXTURE COMPRISING A SOCKET TO BE MECHANICALLY SECURED
ON THE END OF A TUBULAR MEMBER, SUCH AS THE
DISCHARGE SPOUT OF A GAS BOTTLE
Filed Nov. 8, 1968
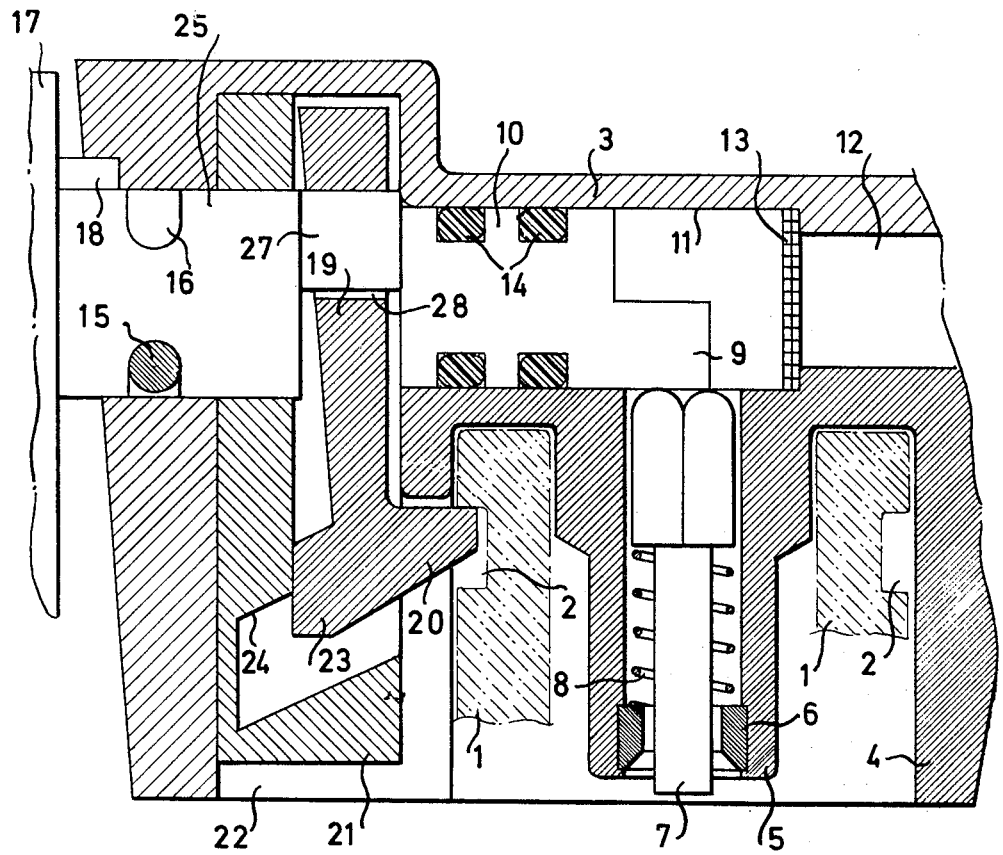
INVENTOR
ERIK O. HENDRIQUES
BY *Stevens, Davis, Miller & Mosher*
ATTORNEYS United States Patent Office 3,522,928
Patented Aug. 4, 1970

3,522,928
FIXTURE COMPRISING A SOCKET TO BE MECHANICALLY SECURED ON THE END OF A TUBULAR MEMBER, SUCH AS THE DISCHARGE SPOUT OF A GAS BOTTLE
Erik Oscar Henriques, Humlebaek, Denmark, assignor to A/S Teknova, Nivaa, Denmark, a company of Denmark
Filed Nov. 8, 1968, Ser. No. 774,355
Claims priority, application Denmark, Nov. 16, 1967, 5,742/67
Int. Cl. F16l 29/00
U.S. Cl. 251—144        3 Claims

ABSTRACT OF THE DISCLOSURE

A fixture for use in connection with the discharge spout of pressurized gas bottles or another tubular member having a closure valve that shall be opened when the fixture is mounted on and releasably locked to the spout or tubular member. For this purpose the fixture comprises a valve opening member and a hook clamping member cooperating with individual eccentric sections of a common shaft which by manual rotation in one direction opens the valve and causes the hook member to engage an external annular groove in the tubular member for clamping the fixture thereto, and by opposite rotation permits the valve to close and releases the clamping effect.

---

This invention relates to a coupling or fixture of the type which comprises a socket to be mechanically secured on the end of a tubular member, such as the discharge spout of a gas bottle, and having means for opening a closure valve located in said tubular member, said fixture further comprising a locking member cooperating with an external annular groove in the tubular member and associated with a shaft which is substantially radial to the socket and upon rotation causes the locking member to enter into the groove and clamps it against a wall thereof.

In a known structure of this type the shaft is journalled in such a way in the housing of the fixture that by rotation in one direction it is positively displaced towards the tubular member, and by rotation in the opposite direction is displaced away from this member. The locking member is formed by a cam provided at the end of the shaft adjacent the tubular member and eccentric relative to said shaft so that by rotation of the shaft the cam is forced against the upper wall of the external groove of the tubular member, thus forcing the socket more or less firmly against the outside of the tubular member. By this operation a tube which is mounted centrally inside the socket engages the closure valve of the tubular member and opens this valve. The required firm securing depends on a considerable pressure between the locking cam and the wall of the groove which means that a substantial friction must be overcome during the composite movement of the shaft, i.e. the simultaneous rotation and displacement thereof. Therefore, the parts which by the rotation of the shaft shall cause it to be displaced must be rather rough in order to be able to stand the wear, and the dimensions of the fixture must be greater than otherwise desirable. Further, an increased manual force is required for rotating the shaft in order to overcome the frictional resistance.

A purpose of the invention is to provide a coupling or fixture which due to a simplified design can be made more compact and safer in its operation than the known embodiment, and is easier to use.

For this purpose the fixture of the invention is characterised in that the shaft comprises a first eccentric section for directly controlling the valve opening means, and a second eccentric section extending through an opening in the shank of a hook member forming the locking member, which is further guided in such a way in the housing of the fixture that its hook portion is moved radially into the groove of the tubular member when, by rotation of the shaft, the hook member is displaced in its clamping direction.

In this case the shaft need only be rotatable, and not also displaceable, in the housing because the required radial movement of the locking member due to its particular guiding in the housing is derived from the rotation of the shaft and does not necessitate displacement of any element of the fixture. In this way it becomes easier to establish and maintain the required sealing around the shaft because the sealing means used for this purpose will be less subjected to wear than in case the shaft must be rotated as well as displaced.

Another advantage is that the opening motion of the closure valve of the tubular member does not depend on the firm clamping of the housing of the fixture upon said member but is derived from the rotation of the shaft and via the valve opening member. This makes possible a favourable coordination of both operations, for instance by a suitable design of both eccentric sections of the shaft.

The radial movement, referred to above, of the hook member may advantageously be ensured in the way that said hook mmber is associated with a heel portion supported by an inclined guide surface in the housing of the fixture. By such arrangement it becomes easy to obtain any desired transmission ratio between the rotation of the shaft and the displacement of the hook portion and to carefully adjust this transmission ratio if necessary for any special purpose.

A preferred embodiment of the invention is characterised in that the guide surface of the housing is provided in a separate piece of wear resistant material accommodated in a recess in the housing and held in place by a centric or coaxial section of the shaft. Such wear resistant piece can without trouble be replaced when needed, and it can be produced with a sufficient degree of accuracy by casting without substantial finishing work. It would be more complicated and more expensive to work out the guide surface in the housing itself.

An embodiment of the fixture according to the invention will now be more fully described with reference to the drawing which to a large scale and with certain portions broken away shows an axial section through the fixture as mounted on the top of the tubular member or neck portion, shown in dot-and-dash lines, or a gas bottle.

The gas bottle neck portion 1 is formed in its external surface with an annular groove 2 or a similar recess. The housing 3 of the fixture comprises a socket 4 surrounding the tubular member or neck portion 1 and provided with an axial tube portion 5 which at its lower end carries a sealing ring 6 and forms a guide for a displaceable valve opening member 7 that is urged upwardly by a pressure spring 8. Thus, the upper end of the valve opening member 7 is held against an eccentric pin 9 carried by the end of a shaft 10 and forming the first eccentric section, referred to in the foregoing, of this shaft. The shaft 10 is journalled in a bore 11, the right hand end of which forms a gas outlet 12 that may be connected to a flexible tube, not shown. By 13 is indicated a filter inserted upstream of the outlet 12. Backwards gas leakage along the shaft 10 is prevented by a pair of ordinary sealing rings 14. The shaft is held against displacement by means of an arresting pin 15 engaging loosely into an annular groove 16 in the shaft. 17 is a knob for manual rotation of the shaft and 18 indicates a cam for limiting such rotational movement.

In the position illustrated on the drawing the valve opening member 7 is pressed farthest downly, and the fixture is locked onto the gas bottle neck 1 by means of a hook member 19, the hook portion 20 of which engages the annular groove 2 of the neck portion 1. The hook member 19 is, together with a wear resistant piece 21, accommodated in a recess 22 in the fixture housing 3, and the hook member comprises a heel portion 23 which is supported by a guide surface, including an inclined section 24, in the wear resistant piece 21. This piece 21 is held in place in the recess 22 by means of a centric or coaxial section 25 of the shaft 10 extending through a narrowly fitting aperture in the wear resistant piece. This centric section is followed by an eccentric shaft section 27 which with a sufficient clearance extends through an opening 28 in the shank of the hook member 19 and is angularly off-set through 180° relative to the eccentric pin 9 of the shaft. On the drawing the eccentric section 27 and thus the hook member 19 are shown in their uppermost positions in which the guide surface of the wear resistant piece 21 forces the hook portion 20 into the annular groove 2. At the same time the hook portion 20 is drawn upwardly to firmly engage the upper wall of the groove so that the housing of the fixture is clamped under a sufficient pressure against the tubular member 1. By rotation of the shaft 10 the hook member 19 will be downwardly displaced and moves, possibly under a positive force, into the recess 22 in the piece 21 so that its hook portion 20 is withdrawn from the groove 2. At the same time the eccentric pin 9 is turned upwardly so that the valve opening member 7 may yield in the same direction, thus causing a re-closing of the valve, not shown, within the neck portion 1.

A fixture as shown may form an integral part of a gas flow regulator intended for mounting on the top of a gas bottle but it may also form a separate element which like a snap action coupling can provide connection between a source for pressurized fluid and a fluid consuming device.

I claim:
1. A fixture comprising a housing forming a socket portion to be mounted on the end of a tubular member, such as the discharge spout of a pressurized gas bottle, having an external annular groove and provided with a closure valve, the fixture further comprising a shaft journalled in said housing so as to extend substantially radially to said socket portion, a valve opening member accommodated in said socket portion and cooperating with a first eccentric section of said shaft, and a hook member accommodated in a recess in said housing and comprising a hook portion for releasably engaging said annular groove and a shank portion cooperating with a second eccentric section of said shaft, said hook member being guided in such a way in said recess that its hook portion is moved radially into and out of said groove when, by rotation of the shaft, the hook portion is displaced towards and away from that wall of the groove which is closest to said shaft.

2. A fixture as claimed in claim 1, wherein said hook member comprises a heel portion supported by an inclined guide surface in said recess.

3. A fixture as claimed in claim 1, wherein said hook member is supported by a guide surface formed by a separate piece of wear resistant material acommodated in said recess and held in place by a centric section of said shaft.

References Cited

UNITED STATES PATENTS

| 2,170,531 | 8/1939 | Kahn | 141—20 |
| 3,407,847 | 10/1968 | Snyder | 137—614.06 |

FOREIGN PATENTS

| 502,884 | 5/1954 | Canada. |
| 1,109,467 | 6/1961 | Germany. |

M. CARY NELSON, Primary Examiner

R. B. ROTHMAN, Assistant Examiner

U.S. Cl. X.R.

251—149.9